United States Patent [19]

Nakagawa et al.

[11] Patent Number: 5,185,166

[45] Date of Patent: * Feb. 9, 1993

[54] PROCESS FOR THE PRODUCTION OF MILK MINERAL CONCENTRATE AND DRINK CONTAINING MINERALS

[75] Inventors: Takahiro Nakagawa, Toyonaka; Shiro Tanaka, Higashikurume, both of Japan

[73] Assignees: San-Ei Chemical Industries, Ltd., Osaka; Chugai Seiyaku Kabushiki Kaisha, Tokyo, both of Japan

[*] Notice: The portion of the term of this patent subsequent to Oct. 16, 2007 has been disclaimed.

[21] Appl. No.: 548,888

[22] PCT Filed: Dec. 5, 1989

[86] PCT No.: PCT/JP89/01218

§ 371 Date: Jul. 25, 1990

§ 102(e) Date: Jul. 25, 1990

[87] PCT Pub. No.: WO90/06060

PCT Pub. Date: Jun. 14, 1990

[30] Foreign Application Priority Data

Dec. 7, 1988 [JP] Japan .................. 63-309152
Dec. 7, 1988 [JP] Japan .................. 63-309153

[51] Int. Cl.$^5$ .................. A23C 9/142
[52] U.S. Cl. .................. 426/74; 426/330.2; 426/334; 426/588
[58] Field of Search .................. 426/74, 334, 330.2, 426/588, 582

[56] References Cited

U.S. PATENT DOCUMENTS 4,652,454  3/1987  Remesy .................. 426/74
4,786,510 11/1988  Nakel .................. 426/74
4,963,387 10/1990  Nakagawa .................. 426/583
4,980,179 12/1990  Koenraads .................. 426/582

FOREIGN PATENT DOCUMENTS 1016391  8/1970  Canada.
53-39494 10/1978  Japan.
62-31890  9/1987  Japan.

OTHER PUBLICATIONS

Cheryan 1986 Ultrafiltration Handbook Technomic Publishing Co. Inc. pp. 235–245.
Perry 1984 Perry's Chemical Engineer's Handbook 6th Edition McGraw-Hill Book Co. pp. 17-27 to 17-33.

Primary Examiner—Carolyn Paden
Attorney, Agent, or Firm—Browdy and Neimark

[57] ABSTRACT

A milk mineral concentrate free from any turbidity or precipitation can be obtained by filtering whey, which is a by-product obtained in the production of cheese and the use of which has been extremely limited so far, at a pH value of from 4 to 6 through an ultrafiltration membrane of a cut-off molecular wright of 40,000 or below; concentrating the filtrate until the concentration of lactose reaches approximately 50%; allowing the concentrate to stand; and removing the lactose thus precipitated. The milk mineral concentrate thus produced has a well-balanced composition containing all essential minerals such as sodium, potassium and calcium, which enable it to be used as an additive for various foods such as drinks for the purpose of providing nutrition.

5 Claims, No Drawings

PROCESS FOR THE PRODUCTION OF MILK MINERAL CONCENTRATE AND DRINK CONTAINING MINERALS

TECHNICAL FIELD

This invention relates to a process for the advantageous production of a milk mineral concentrate on an industrial scale free from any turbidity or precipitation and also a drink containing milk minerals.

BACKGROUND ART

Regarding the application of whey, which is a by-product obtained in the production of cheese, whey proteins obtained through membrane separation techniques have been widely employed as an excellent protein source in the food industry. However, the use of the mother liquor obtained by concentrating an ultrafiltrate of whey and precipitating lactose is extremely limited, though it contains all the milk minerals including potassium and calcium.

DISCLOSURE OF THE INVENTION

We have conducted extensive studies on the production of milk minerals from whey and consequently found that most milk minerals can be recovered by subjecting whey to ultrafiltration under such conditions as will be described later to thereby give a milk mineral concentrate free from any turbidity or precipitation. This milk mineral concentrate has a high milk mineral content and is accordingly highly useful. The milk minerals thus obtained show a well-balanced composition containing all essential trace minerals such as sodium, potassium and calcium, which makes it highly useful as a food additive for various foods, in particular, for drinks.

The present invention relates to a process for the production of a milk mineral concentrate free from any turbidity or precipitation which comprises filtering whey at a pH value of from 4 to 6 through an ultrafiltration membrane having a cut-off molecular weight of 40,000 or below; concentrating the obtained filtrate until the lactose concentration thereof reaches approximately 50%; allowing the obtained concentrate to stand at from 0° to 20° C.; and removing the lactose thus precipitated; as well as a drink containing milk minerals.

BEST MODE FOR CARRYING OUT THE INVENTION

The term "whey" as used herein means a transparent yellowish green solution obtained as a by-product in the production of cheese from the fresh milk of mammals such as cow. In the present invention, it is particularly preferable to use sweet whey which is obtained as a by-product in the production of cheese from fresh cow's or goat's milk. The ultrafiltration may be conducted by, for example, treating whey having a pH value of from 4 to 6 with filtration device provided with an ultrafiltration membrane having a cut-off molecular weight of 40,000 or below, preferably from 10,000 to 40,000, under a pressure of 3 kg/cm$^2$. After the completion of the ultrafiltration, the filtrate is concentrated until the lactose content reaches approximately 50% and then allowed to stand at from 0° to 20° C. for from 10 to 12 hours to thereby precipitate lactose. More desirable results may be achieved by adding a small amount of lactose as a seed upon the precipitation of the lactose. The lactose thus precipitated is removed by, for example, centrifuging. Thus, a milk mineral concentrate free from any turbidity or precipitation can be obtained. When the pH value of the starting whey is not adjusted to from 4 to 6 or no ultrafiltration membrane of a cut-off molecular weight of 40,000 or below is employed, the resulting milk mineral concentrate showed turbidity or precipitation. Such a milk mineral concentrate has a lowered commercial value, since it cannot be applied to products which are required to be transparent without showing any turbidity or precipitation, such as sauces, dressings, drinks, drippings and soy sauces. Further, the obtained milk mineral concentrate free from any turbidity or precipitation may be diluted with distilled water and spray-dried so as to give a powdery milk mineral concentrate.

The milk minerals thus obtained comprise, for example, 96 to 98% (by weight, the same will apply hereinafter) of total solid matters, 38 to 60% of lactose, 1 to 3% of proteinous nitrogen, 20 to 35% of ash (containing 2 to 10% of potassium, 2 to 5% of calcium, 2.5 to 5% of sodium 0.2 to 0.5% of magnesium, 0.7 to 15 μg/g of iron, 1 to 5 μg/g of manganese, 1 to 5 μg/g of zinc and 1 to 5 μg/g of copper) and 0.1 to 5% of phosphorus.

The milk mineral concentrate may be uniformly added in the production of various drinks to thereby give mineral-containing or mineral-enriched drinks. Examples of said drinks include optionally concentrated fruit juices such as orange, apple and peach juices, fruit juice drinks, fruit drinks, sports drinks, nutritious drinks, carbonated drinks such as cola, ginger ale and soda pop, cocca, coffee, black tea and drinks containing the same, lactic acid drinks, cow's milk, soybean milk, vegetable drinks such as tomato, lettuce and celery drinks, alcoholic drinks and mineral water.

Although the amount of the milk mineral concentrate to be added to these drinks may vary depending on the characteristics of each drink, it may be usually used in such an amount as to give a content of from 0.01 to 10% based on the total final product.

The milk mineral concentrate of the present invention may be used together with, for example, sodium chloride or natural fruit juices so as to control the content of sodium potassium, magnesium, etc. Furthermore, vitamins, protein decomposition products, various amino acids and dietary fibers may be employed therewith.

EXAMPLE 1

The pH value of whey sweet obtained as a by-product in the production of Cheddar cheese was adjusted to 3, 3.5, 4, 4.5, 5, 5.5, 6, 6.5, 7 and 7.5 with potassium hydroxide or citric acid. 100 l of each whey sweet thus treated was treated with a filtration device provided with an ultrafiltration membrane of a cut-off molecular weight of 40,000 under a pressure of 5 kg/cm$^2$ to thereby give approximately 80 l of a filtrate. The filtrate thus obtained was concentrated under reduced pressure until the volume was reduced to approximately 1/10.

The lactose concentration of each concentrate thus obtained was approximately 50%, while the total solid content thereof was approximately 58%. Next, the concentrate was cooled to 30° C. and a small amount of lactose was added thereto as a seed. After allowing to stand at 15° C. for 10 hours, the lactose thus precipitated was separated by centrifuging and washed with cold water. Thus approximately 3.0 kg of lactose crystals were obtained in each case. On the other hand, approximately 5 kg of a milk mineral concentrate was separated by the above centrifugation in each case.

The milk mineral concentrates thus obtained were compared by eye. Further, they were introduced in colorless and transparent glass bottles and stored in a refrigerator at 5° C. for 10 days. These products were compared by eye again. The above procedure was repeated except for the use of ultrafiltration membranes of cut-off molecular weights of 10,000, 20,000, 60,000, 80,000 and 100,000.

Table 1 summarizes the results. As Table 1 indicates, each milk mineral concentrate obtained by adjusting the pH value of the starting whey to from 4 to 6 and subsequently being treated with an ultrafiltration membrane of a cut-off molecular weight of 40,000 or below had a high transparency without showing any turbidity or precipitation.

EXAMPLE 2

50 l of fresh whey sweet was neutralized with sodium hydroxide and the pH value thereof was adjusted to 5. Then, it was treated with a filtration device provided with an ultrafiltration membrane of a cut-off molecular weight of 30,000 under a pressure of 3 kg/cm$^2$. Thus, 41 l of a transparent filtrate was obtained. This filtrate was concentrated under reduced pressure until the volume was reduced to 1/10. After adding a small amount of lactose as a seed, it was allowed to stand at 10° C. for 12 hours. The content of total solid matters of this concentrate was 57.1% while the lactose content thereof was 48.9%. The concentrate was centrifuged and the lactose thus precipitated was removed to thereby give 2.0 kg of a milk mineral concentrate which was free from any turbidity or precipitation. Further, 4 kg of distilled water was added to 2 kg of this concentrate and the obtained mixture was spray dried. Thus, a powdery milk mineral concentrate was obtained.

TABLE 1

Production Conditions of Milk Mineral Concentrates and Properties Thereof

| Test No. | pH of whey | Ultra-filtration conditions Cut-off level m.w. (× 10$^4$) | Immediately after production Turbidity | Precipitation | After allowing to stand (5° C., 10 days) Turbidity | Precipitation |
|---|---|---|---|---|---|---|
| 1 | 3   | 1 (× 10$^4$) | +    | −   | +    | +     |
|   |     | 2            | +    | −   | +    | +     |
|   |     | 4            | +    | −   | +    | +     |
|   |     | 6            | +    | −   | +    | +     |
|   |     | 8            | +++  | ++  | +++  | +++   |
|   |     | 10           | ++++ | +++ | ++++ | +++++ |
| 2 | 3.5 | 1            | +    | −   | +    | +     |
|   |     | 2            | +    | −   | +    | +     |
|   |     | 4            | +    | −   | +    | +     |
|   |     | 6            | +    | −   | +    | +     |
|   |     | 8            | +++  | ++  | +++  | +++   |
|   |     | 10           | ++++ | +++ | ++++ | ++++  |
| 3 | 4   | 1            | −    | −   | −    | −     |
|   |     | 2            | −    | −   | −    | −     |
|   |     | 4            | −    | −   | −    | −     |
|   |     | 6            | ±    | −   | +    | +     |
|   |     | 8            | ++   | +   | ++   | ++    |
|   |     | 10           | +++  | ++  | +++  | +++   |
| 4 | 4.5 | 1            | −    | −   | −    | −     |
|   |     | 2            | −    | −   | −    | −     |
|   |     | 4            | −    | −   | −    | −     |
|   |     | 6            | ±    | −   | +    | +     |
|   |     | 8            | ++   | +   | ++   | ++    |
|   |     | 10           | +++  | ++  | +++  | +++   |
| 5 | 5   | 1            | −    | −   | −    | −     |
|   |     | 2            | −    | −   | −    | −     |
|   |     | 4            | −    | −   | −    | −     |
|   |     | 6            | ±    | −   | +    | +     |
|   |     | 8            | +    | +   | ++   | ++    |
|   |     | 10           | ++   | ++  | +++  | +++   |
| 6 | 5.5 | 1 (× 10$^4$) | −    | −   | −    | −     |
|   |     | 2            | −    | −   | −    | −     |
|   |     | 4            | −    | −   | −    | −     |
|   |     | 6            | ±    | −   | +    | +     |
|   |     | 8            | +    | +   | ++   | ++    |
|   |     | 10           | ++   | ++  | +++  | +++   |
| 7 | 6   | 1            | −    | −   | −    | −     |
|   |     | 2            | −    | −   | −    | −     |
|   |     | 4            | −    | −   | −    | −     |
|   |     | 6            | ±    | −   | +    | +     |
|   |     | 8            | ++   | +   | ++   | ++    |
|   |     | 10           | +++  | ++  | +++  | +++   |
| 8 | 6.5 | 1            | +    | −   | +    | +     |
|   |     | 2            | +    | −   | +    | +     |
|   |     | 4            | +    | −   | +    | +     |
|   |     | 6            | +    | −   | +    | +     |
|   |     | 8            | ++   | +   | ++   | ++    |
|   |     | 10           | +++  | +   | +++  | ++    |
| 9 | 7   | 1            | +    | −   | +    | +     |
|   |     | 2            | +    | −   | +    | +     |

TABLE 1-continued

Production Conditions of Milk Mineral Concentrates and Properties Thereof

| Test No. | pH of whey | Ultra-filtration conditions Cut-off level m.w. (× 10^4) | Immediately after production Turbidity | Immediately after production Precipitation | After allowing to stand (5° C., 10 days) Turbidity | After allowing to stand (5° C., 10 days) Precipitation |
|---|---|---|---|---|---|---|
|  |  | 4 | + | − | + | + |
|  |  | 6 | + | − | + | + |
|  |  | 8 | ++ | + | ++ | ++ |
|  |  | 10 | +++ | + | +++ | ++ |
| 10 | 7.5 | 1 | + | − | + | + |
|  |  | 2 | + | − | + | + |
|  |  | 4 | + | − | + | + |
|  |  | 6 | + | − | + | + |
|  |  | 8 | ++ | + | ++ | ++ |
|  |  | 10 | +++ | + | +++ | ++ |

Note: (−) means no turbidity or precipitation and the degree of the turbidity or precipitation increase with an increase in the number of (+).

EXAMPLE 3

A 50% orange juice was produced by a conventional method in such a manner that a whey mineral (containing 6% of potassium, 3% of calcium, 3% of sodium, 0.3% of magnsium, 10 µg/g of iron, 5 µg/g manganese, 5 µg/g of zinc, 3 µg/g of copper and 3% of phosphorus) was added to give a content of 2% based on the total final product. Thus, a well-balanced mineral-enriched fruit juice containing 0.12% of potassium 0.06% of calcium, 0.06% of sodium, 0.006% of magnesium, 0.2 µg/g of iron, 0.1 µg/g of manganese, 0.1 µg/g of zinc, 0.1 µg/g of copper and 0.06% of phosphorus was obtained.

EXAMPLE 4

A concentrated apple juice was produced by a conventional method in such a manner that 0.2% of the same whey mineral as the one used in Example 3 was added to an apple juice of a purity of 99.8% followed by concentrating 5-fold. Thus, a mineral-enriched concentrated apple juice containing 0.06% of potassium, 0.03% of calcium, 0.03% of sodium, 0.003% of magnesium, 0.1 µg/g of iron, 0.05 µg/g of manganese, 0.05 µg/g of zinc, 0.05 µof copper and 0.03% of phosphorus was obtained.

EXAMPLE 5

A peach nectar was produced by a conventional method in such a manner that the same whey mineral as the one used in Example 3 was added to thereby give a content of 3% based on the total final product. Thus, a mineral-enriched peach nectar containing 0.18% of potassium, 0.09% calcium, 0.09% of sodium, 0.009% of magnesium, 0.3 µg/g of iron, 0.15 µg/g of manganese, 0.15 µg/g of zinc, 0.15 µg/g of copper and 0.09% of phosphorus was obtained.

EXAMPLE 6

A sport drink was produced in such a manner that a whey mineral (containing 2% of potassium, 2% of calcium, 2.5% of sodium, 0.2% of magnesium, 0.7 µg/g of iron, 1 µg/g of manganese, 1 µof zinc, 1 µg/g of copper and 0.1% of phosphorus) was added to give a content of 0.6% based on the total final product. Thus, a mineral-enriched sports drink containing 0.012% of potassium, 0.012% of calcium, 0.015% of sodium, 0.0012% of magnesium, 0.0042 µg/g of iron, 0.006 µg/g of manganese, 0.006 µg/g of zinc, 0.006 µg/g of copper and 0.006% of phosphorus was obtained.

EXAMPLE 7

A nutritious drink was produced by a conventional method in such a manner that 0.05% of vitamin C, 0.01% of vitamin $B_2$, 0.001% of pyridoxine hydrochloride, 0.0005% of methyl hesperidin, 0.0005% of folic acid, 0.0005% of nicotinamide, 0.02% of L-phenylalanine, 0.5% of oligopeptide (decomposed whey proteins) and the same whey mineral as the one used in Example 3 were added to give a content of 1% based on the total final product. Thus, a mineral-enriched nutritious drink containing 0.02% of potassium, 0.03% of calcium, 0.03% of sodium, 0.003% of magnesium, 0.1 µg/g of iron, 0.05 µg/g of manganese, 0.05 µg/g of zinc, 0.03 µg/g of copper and 0.03% of phosphorus was obtained.

EXAMPLE 8

A ginger ale was produced by a conventional method in such a manner that the same whey mineral as the one used in Example 6 was added to give a content of 1% based on the total final product. Thus, a mineral-enriched ginger ale containing 0.02% of potassium, 0.02% of calcium, 0.025% of sodium, 0.002% of magnesium, 0.007 µg/g of iron, 0.01 µg/g of manganese, 0.01 µg/g of zinc, 0.01 µg/g of copper and 0.001% of phosphorus was obtained.

EXAMPLE 9

A coffee drink was produced by a conventional method in such a manner that the same whey mineral as the one used in Example 3 was added to give a content of 5% based on the total final product. Thus, a mineral-enriched coffee drink containing 0.3% of potassium, 0.15% of calcium, 0.15% of sodium, 0.015% of magnesium, 0.5 µg/g of iron, 0.25 µg/g of manganese, 0.25 µg/g of zinc, 0.15 µg/g of copper and 0.15% of phosphorus was obtained.

EXAMPLE 10

A lactic acid drink was produced by a conventional method in such a manner that the same whey mineral as the one used in Example 6 was added to give a content of 8% based on the total final product. Thus, a mineral-enriched lactic acid drink containing 0.16% of potassium, 0.16% of calcium, 0.2% of sodium, 0.016% of magnesium, 0.056 µg/g of iron, 0.08 µg/g of manganese, 0.08 μg/g of zinc, 0.08 μg/g of copper and 0.008% of phosphorus was obtained.

EXAMPLE 11

A cow's milk was produced by a conventional method in such a manner that the same whey mineral as the one used in Example 3 was added to give a content of 5% based on the total final product. Thus, a mineral-enriched cow's milk containing 0.3% of potassium, 0.15% of calcium, 0.15% of sodium, 0.015% of magnesium, 0.5 μg/g of iron, 0.25 μg/g of manganese, 0.25 μg/g of zinc, 0.15 μg/g of copper and 0.15% of phosphorus was obtained.

EXAMPLE 12

A soybean milk was produced in such a manner that polydextrose (dietary fiber) and the same whey mineral as the one used in Example 3 were added to respectively give contents of 1% and 2% based on the total final product. Thus, a mineral-enriched and dietary fiber-containing soybean milk containing 0.12% of potassium, 0.06% of calcium, 0.06% of sodium, 0.006% of magnesium, 0.2 μg/g of iron, 0.1 μg/g of manganese, 0.1 μg/g of zinc, 0.1 μg/g of copper and 0.06% of phosphorus was obtained.

EXAMPLE 13

A vegetable drink containing 35% of tomato, 5% of celery and 5% of lettuce was produced in such a manner that the same whey mineral as the one used in Example 3 was added to give a content of 2%. Thus, a mineral-enriched vegetable drink containing 0.12% of potassium, 0.06% of calcium, 0.06% of sodium, 0.006% of magnesium, 0.2 μg/g of iron, 0.1 μg/g of manganese, 0.1 μg/g of zinc, 0.1 μg/g of copper and 0.06% of phosphorus was obtained.

EXAMPLE 14

An alcoholic drink containing 14% of ethyl alcohol was produced in such a manner that the same whey mineral as the one used in Example 6 was added to give a content of 0.6% based on the total final product. Thus, a mineral-enriched alcoholic drink containing 0.012% of potassium, 0.012% of calcium, 0.015% of sodium, 0.0012% of magnesium, 0.0042 μg/g of iron, 0.006 μg/g of manganese, 0.006 μg/g of zinc, 0.006 μg/g of copper and 0.006% of phosporus was obtained.

EXAMPLE 15

A mineral water was produced in such a manner that the same whey mineral as the one used in Example 6 was added to give a content of 0.6% based on the total final product. Thus, a mineral-enriched mineral water containing 0.012% of potassium, 0.012% of calcium, 0.015% of sodium, 0.0012% of magnesium, 0.0042 μg/g of iron, 0.006 μg/g of manganese, 0.006 μg/g of zinc, 0.006 μg/g of copper and 0.006% of phosphorus was obtained.

INDUSTRIAL APPLICABILITY

The milk mineral concentrate obtained by the process of the present invention shows a well-balanced composition containing all trace essential minerals such as sodium, potassium and calcium. In addition, this milk mineral concentrate is characteristically free from any turbidity or precipitation. Therefore, it can be greatly expected that said concentrate will be utilized as a food additive for various kinds of foods such as drinks.

We claim:

1. A process for the production of a milk mineral concentrate free from any turbidity or precipitation, which consists essentially of filtering whey at a pH value of from 4 to 6 through an ultrafiltration membrane of a cut-off molecular weight of 40,000 or below; concentrating the filtrate until the concentration of lactose reaches approximately 50%; allowing the concentrate to stand; and removing the lactose thus precipitated to produce a product having an ash content of 20–35% which product is transparent.

2. A process for the production of a milk mineral concentrate free from any turbidity or precipitation as claimed in claim 1, wherein said whey is sweet whey obtained as a by-product in the production of cheese.

3. A process for the production of a milk mineral concentrate as claimed in claim 1, wherein an ultrafiltration membrane having a cut-off molecular weight of from 10,000 to 40,000 is used.

4. A drink containing a transparent milk mineral concentrate which is produced by the process of claim 1.

5. A process for the production of a powdery milk mineral concentrate which when dissolved in water produces a solution which is free from any turbidity or precipitation, which consists essentially of filtering whey at a pH value of from 4 to 6 through an ultrafiltration membrane of a cut-off molecular weight of 40,000 or below; concentrating the filtrate until the concentration of lactose reaches approximately 50%; allowing the concentrate to stand; removing the lactose thus precipitated; diluting the concentrate so formed with distilled water, and spray-drying the diluted concentrate.

* * * * *